(12) United States Patent
Currans

(10) Patent No.: US 7,146,434 B2
(45) Date of Patent: Dec. 5, 2006

(54) METHOD FOR DOWNLOADING DATA VIA THE INTERNET TO A BROWSER ENABLED COMPUTER

(75) Inventor: Kevin G Currans, Philomath, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 778 days.

(21) Appl. No.: 10/146,553

(22) Filed: May 15, 2002

(65) Prior Publication Data

US 2003/0217116 A1 Nov. 20, 2003

(51) Int. Cl.
*G06F 15/16* (2006.01)
(52) U.S. Cl. ............ 709/246; 709/217; 709/219; 709/236; 709/247
(58) Field of Classification Search ............ 380/54; 382/100, 168, 240; 718/102; 709/246, 204, 709/236, 240
See application file for complete search history.

(56) References Cited

U.S. PATENT DOCUMENTS

| | | | | |
|---|---|---|---|---|
| 6,023,511 A * | 2/2000 | Chen et al. | ............ | 380/54 |
| 6,192,412 B1 * | 2/2001 | Cantoral et al. | ............ | 709/236 |
| 6,353,892 B1 * | 3/2002 | Schreiber et al. | ............ | 713/201 |
| 6,430,591 B1 * | 8/2002 | Goddard | ............ | 718/102 |
| 6,549,674 B1 * | 4/2003 | Chui et al. | ............ | 382/240 |
| 6,760,749 B1 * | 7/2004 | Dunlap et al. | ............ | 709/204 |
| 6,915,012 B1 * | 7/2005 | Osborne et al. | ............ | 382/232 |
| 2001/0000265 A1 * | 4/2001 | Schreiber et al. | ............ | 713/201 |
| 2001/0036271 A1 * | 11/2001 | Javed | ............ | 380/217 |
| 2002/0051559 A1 * | 5/2002 | Noda et al. | ............ | 382/100 |
| 2002/0159632 A1 * | 10/2002 | Chui et al. | ............ | 382/168 |
| 2003/0110296 A1 * | 6/2003 | Kirsch et al. | ............ | 709/246 |
| 2004/0049598 A1 * | 3/2004 | Tucker et al. | ............ | 709/246 |

FOREIGN PATENT DOCUMENTS

| | | | |
|---|---|---|---|
| WO | WO 99/34286 | * | 7/1999 |
| WO | WO 00/76204 | | 12/2000 |
| WO | WO 01/54370 | | 6/2001 |

OTHER PUBLICATIONS

Digimarc Corporation, Digimark Watermarking Guide, 1999.
http://www.instant-delivery.com/Home/; HP Instant Delivery; Jun. 12, 2001; 6 pages.
Donovan Artz, "Digital Steganography: Hiding Data within Data", IEEE Internet Computing, May/Jun. 2001, pp. 75-80.
XP-002266110, Web Site Design Workshop, Tutorial -4 "JavaScript- Dynamic Tool Tips".

* cited by examiner

*Primary Examiner*—Rupal Dharia
*Assistant Examiner*—Quang N. Nguyen

(57) ABSTRACT

A method for downloading data, includes the steps of partitioning a file targeted for downloading into a set of segments, with each segment comprising segment data. The method also includes encapsulating the set of segments into a set of graphics files and downloading a subset of graphics files within the set of graphics files into a cache corresponding to a computer system coupled to the Internet. The method further includes extracting segment data encapsulated within the subset of graphics files to recreate a portion of the file targeted for downloading.

33 Claims, 9 Drawing Sheets

METHOD FOR DOWNLOADING DATA VIA THE INTERNET TO A BROWSER ENABLED COMPUTER

BACKGROUND OF THE INVENTION

The present invention relates generally to techniques for managing Internet bandwidth. More particularly, the present invention encompasses various systems and methods for arranging a file into one or more graphics files, and transferring the graphics files into a cache when a browser paints a web page.

Internet-based information downloading offers the promise of ease and convenience. Downloading large files, however, can be quite time consuming in the absence of a high-speed Internet connection. In particular, downloading an application, application upgrade, or application update over a conventional modem-based Internet connection may take a considerable amount of time, possibly on the order of an hour. During this time, downloading may virtually be the only activity that can take place over such an Internet connection. Moreover, in the event that an Internet user is charged on an hourly or similar basis for connection time, downloading can become undesirably costly. Therefore, there is a need for a technique for enhancing Internet downloading efficiency and managing bandwidth during download operations, particularly relative to downloading large files such as executables.

DETAILED DESCRIPTION

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

Embodiments of the present invention comprise a system and method for enhanced efficiency information downloading over the Internet. Such information may be of any type, and may comprise, for example, executable files, device driver files, virus definition files, promotional materials, coupons, advertisements, and/or other types of information. One embodiment of the present invention includes the encapsulation into segments of a file selected for downloading into a set of small or generally small graphics or image files, which may be, for example, Graphics Interchange Format (GIF) and/or Portable Network Graphics (PNG) files.

In one embodiment, a graphics or image file that encapsulates a segment may contain no additional or other payload information beyond the segment itself. In another embodiment, a graphics or image file that encapsulates a segment may contain additional or other information such as image data that is not inherently part of or formed from the segment and/or file selected for downloading. This embodiment includes the encoding of a segment corresponding to a file targeted for downloading into an image within the graphics file, in a manner that accords with digital watermarking.

Embodiments of the invention may further add or incorporate a reference to the aforementioned graphics files into HyperText Markup Language (HTML) code defining a web page. When an Internet user's browser paints such a web page, one or more of the aforementioned graphics files may be transferred or downloaded into a browser cache and/or a proxy server cache. An embodiment of the invention subsequently recreates and/or reassembles the file targeted for downloading once each graphics file into which file segments had been encapsulated has been received. When an Internet user is browsing or web surfing, embodiments of the present invention perform download operations during idle browsing periods, thereby intelligently managing available bandwidth.

Figure 1:
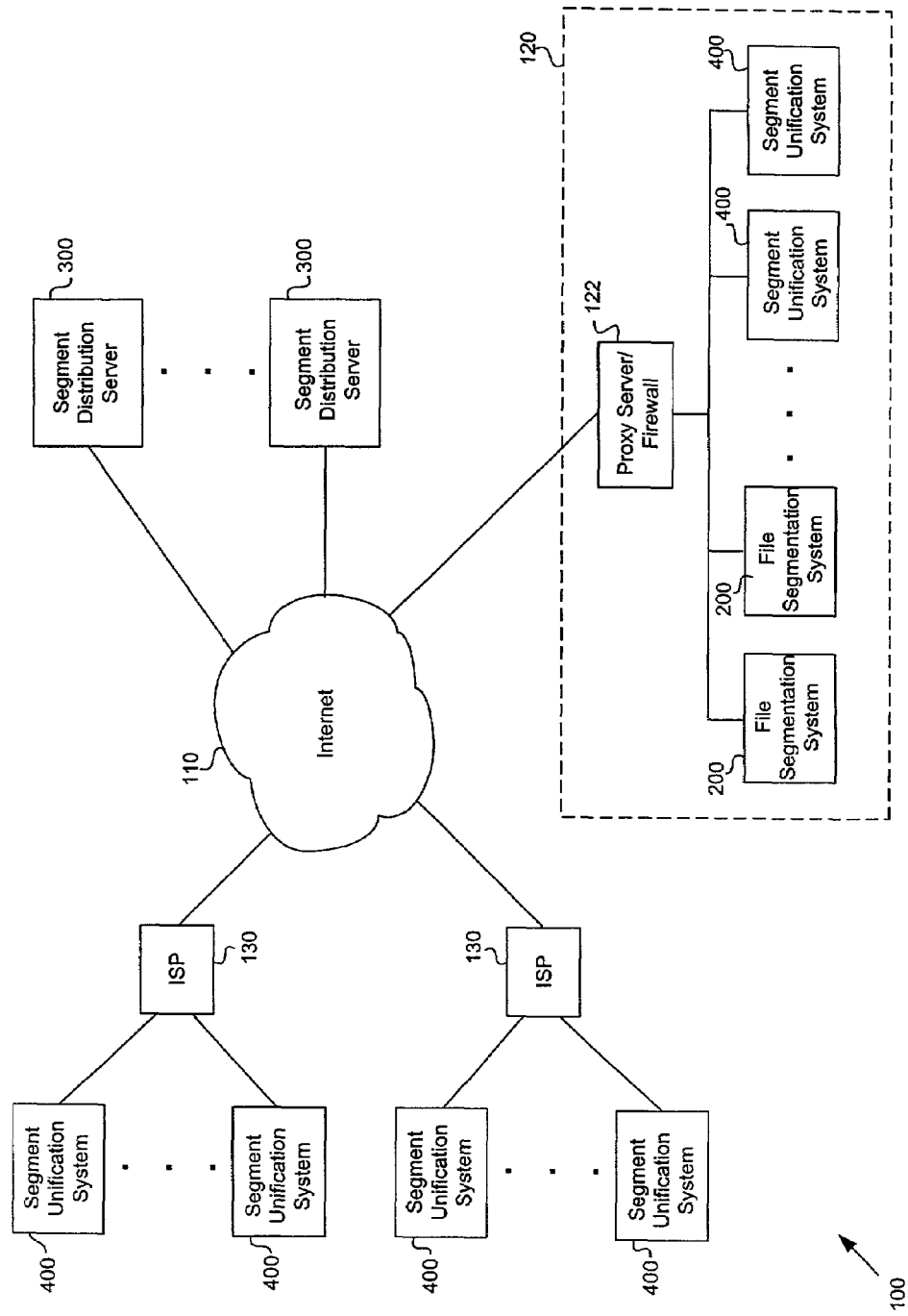
FIG. 1 is a block diagram of a system for enhanced efficiency Internet downloading according to an embodiment of the invention.

FIG. 1 is a block diagram of a system 100 for Internet downloading according to an embodiment of the invention. In one embodiment, the system 100 comprises a file segmentation system 200, a segment distribution server 300, and at least one segment unification system 400, each of which is coupled to the Internet 110. Various embodiments include multiple file segmentation systems 200 and/or multiple segment distribution servers 300. Any given file segmentation system 200 and/or any given segment unification system 400 may exist within the context of a Local Area Network (LAN) 120, a Wide Area Network (not shown), and/or one or more other networks coupled to the Internet 110. A proxy server 122 may exist within the context of a LAN 120 or other network, in a manner understood by those skilled in the art. Additionally, one or more file segmentation systems 200 may be coupled to an Internet Service Provider (ISP) 130, which facilitates coupling to and communication over the Internet 110.

The file segmentation system 200 comprises a computer system capable of a) encapsulating segments of a file targeted for downloading 240 (FIG. 2) into one or more graphics files; b) updating database information and a web page definition associated with such graphics files; and c) transferring or uploading database information and the web page definition to a segment distribution server 300 to facilitate subsequent transfer of graphics files containing segments of the file targeted for downloading 240 into a web browser's cache in accordance with the present invention.

Figure 2:
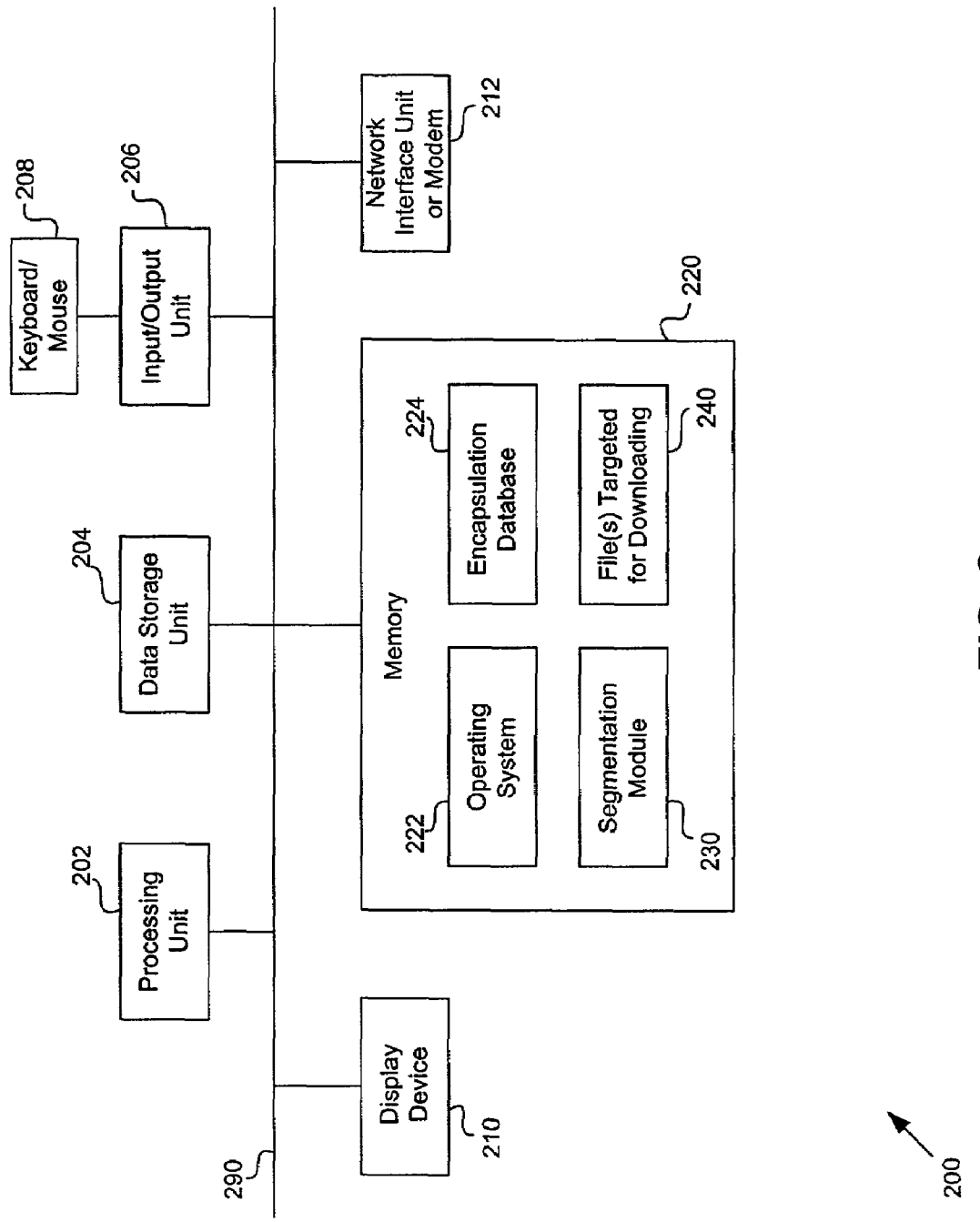
FIG. 2 is a block diagram of a file segmentation system according to an embodiment of the invention.

FIG. 2 is a block diagram of a file segmentation system 200 according to an embodiment of the invention. In one embodiment, the file segmentation system 200 comprises a computer system having a processing unit 202; a data storage unit 204; an input/output unit 206 coupled to a keyboard and a mouse 208; a display device 210; a network interface unit or a modem 212; and a memory 220, each of which is coupled to a common bus 290. The network interface unit 212 is further coupled to the Internet 110 (of FIG. 1).

The memory 220 includes an operating system 222, an encapsulation database 224, a segmentation module 230, and one or more files targeted for downloading 240. One or more portions of the encapsulation database 224 and/or any given file targeted for downloading 240 resides upon the data storage unit 204. The operating system 222 comprises program instructions for managing access to hardware and/or software resources associated with the file segmentation system 200. The segmentation module 230 comprises program instructions for performing file segmentation operations in accordance with the present invention, as described in detail herein with reference to FIG. 5.

The segment distribution server 300 (FIG. 1) comprises a web server system that distributes graphics files containing segments of a file targeted for downloading 240 (of FIG. 2). The segment distribution server 300 distributes such graphics files in response to client requests. The segment distribution server 300 additionally distributes other types of web content and/or objects in a manner readily understood by those skilled in the art.

Figure 3:
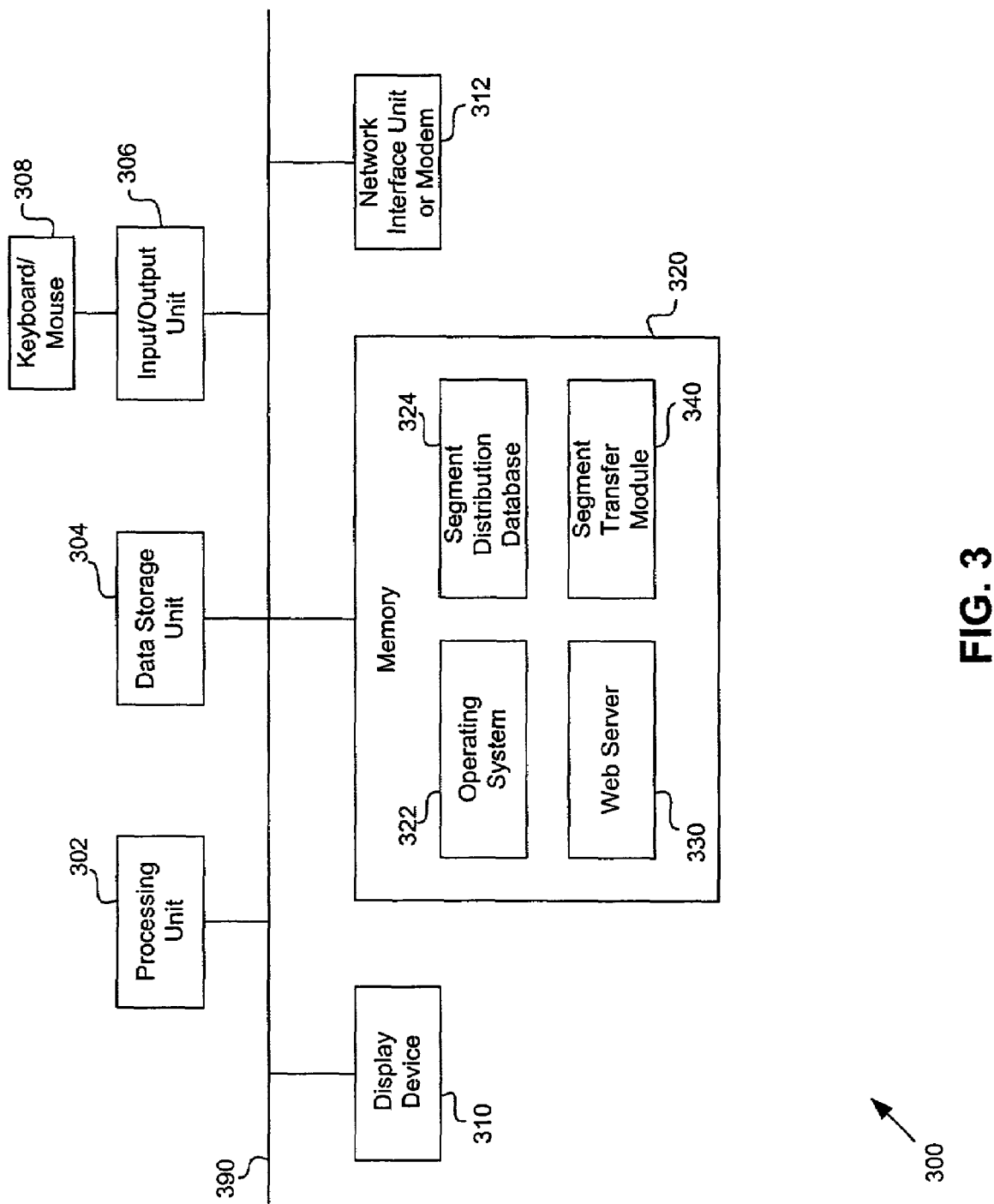
FIG. 3 is a block diagram of a segment distribution server according to an embodiment of the invention.

FIG. 3 is a block diagram of a segment distribution server 300 according to an embodiment of the invention. In one embodiment, the segment distribution server 300 comprises a server or computer system having a processing unit 302; a data storage unit 304; an input/output unit 306 coupled to a keyboard and a mouse 308; a display device 310; a network interface unit 312; and a memory 320, each of which is coupled to a common bus 390. Additionally, the network interface unit 312 is coupled to the Internet 110 (of FIG. 1).

The memory 320 includes an operating system 322, a segment distribution database 324, and a web server 330. In one embodiment, the memory 320 further includes a segment transfer module 340. One or more portions of the segment distribution database 324 reside upon the data storage unit 304. The web server 330 comprises conventional web server software for receiving requests from clients over the Internet, and responding thereto. The segment transfer module 340 comprises programming language and/or scripting language statements or instructions for selectively transferring one or more graphics files containing segments of a file targeted for downloading 240 (of FIG. 2) to clients. The segment transfer module 340 may be implemented, for example, using a Common Gateway Interface (CGI) script. Manners in which the web server 330 and the segment transfer module 340 transfer graphics files that camouflage or encapsulate portions of a file targeted for downloading 240 are further described below with reference to FIG. 7.

The segment unification system 400 (of FIG. 1) may comprise a browser-enabled computer and/or an Internet appliance capable of requesting and/or retrieving web content. The segment unification system 400 may store recently received web content, including graphics files, in a cache, where such graphics files may encapsulate portions or segments of a file targeted for downloading 240.

Figure 4:
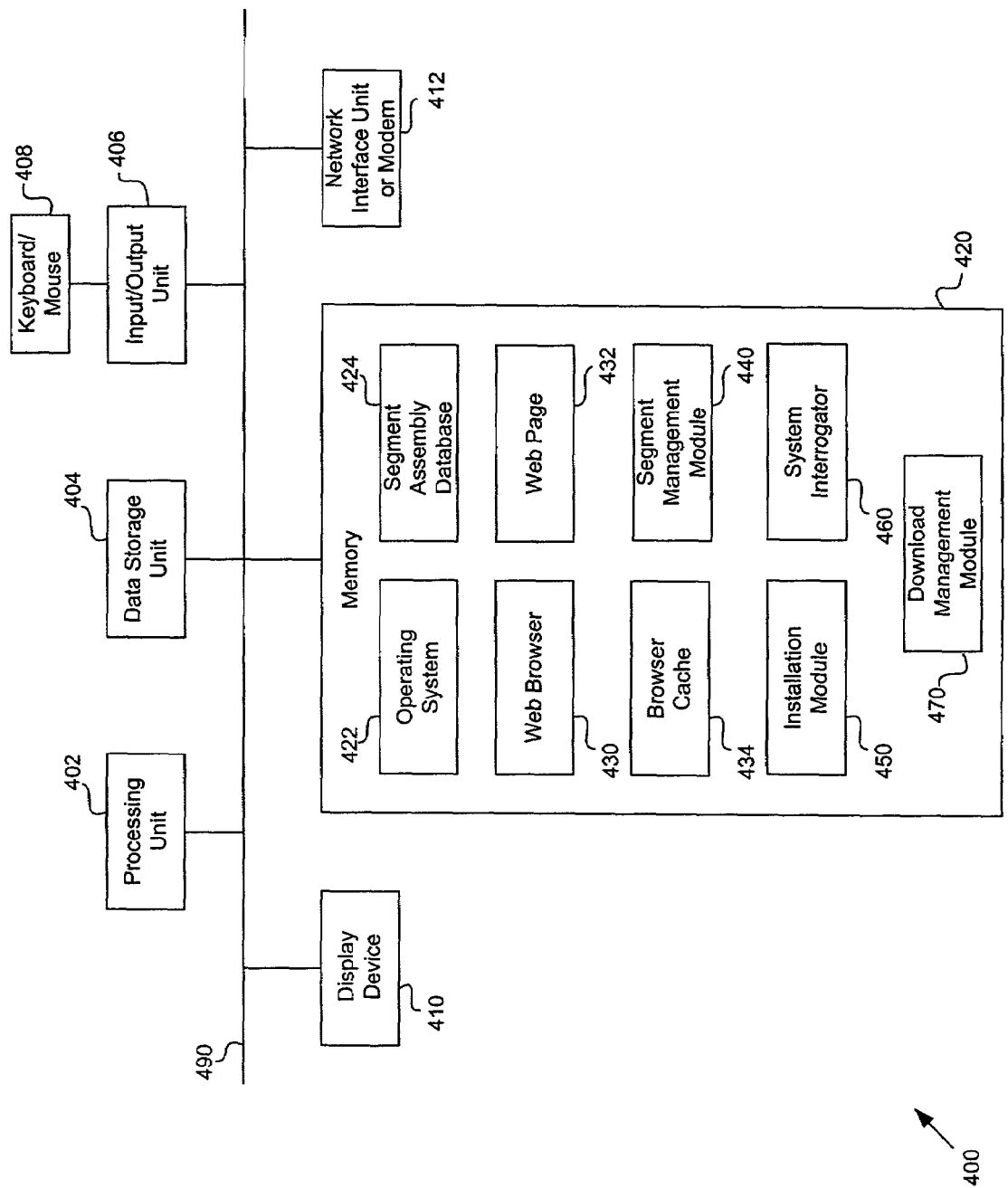
FIG. 4 is a block diagram of a segment unification system according to an embodiment of the invention.

FIG. 4 is a block diagram of a segment unification system 400 according to an embodiment of the invention. In one embodiment, the segment unification system 400 comprises a browser-enabled computer having a processing unit 402; a data storage unit 404; an input/output unit 406 coupled to a keyboard and a mouse 408; a display device 410; a network interface unit or a modem 412; and a memory 420, each of which may be coupled to a common bus 490. The network interface unit 412 is further coupled to the Internet 110.

The memory 420 includes an operating system 422, a segment assembly database 424, a web browser 430, and a browser cache 434. One or more portions of the segment assembly database 424 and/or the browser cache 434 resides upon the data storage unit 404, in a manner understood by those skilled in the art. The memory 420 also includes a web page 432 that references a set of graphics files camouflaging or encapsulating segments of a file targeted for downloading 240 in accordance with the present invention once a segment distribution server 300 has delivered or transferred such a web page 432 to the segment unification system 400 in response to a web browser request.

The operating system 422 comprises program instructions for managing access to segment unification system hardware and/or software resources in a manner understood by those skilled in the art. The web browser 430 comprises a conventional web browser such as Microsoft Internet Explorer (Microsoft Corporation, Redmond, Wash.), which facilitates web surfing operations in a manner readily understood by those skilled in the art. The web browser 430 requests a web page 432 from a segment distribution server 300 during web surfing operations, where the web page 432 may comprise HTML and/or Javascript statements.

A web page 432 may include statements or references to one or more graphics files that encapsulate or camouflage segments of a file targeted for downloading 240. In one embodiment, graphics files encapsulating file segments remain undisplayed following their retrieval. Additionally or alternatively, graphics files encapsulating file segments may be displayed in a nonevident or minimally evident manner once retrieved. Exemplary types of web page references that retrieve graphics files in such manners are provided hereafter.

An exemplary HTML statement capable of initiating retrieval of a graphics file into a browser cache and displaying the graphics file in a hidden, nonevident, or generally nonevident manner is as follows:

<img src="segment1.gif" width=1, height=1>

In accordance with the above HTML statement, "segment1.gif" will be retrieved and stored in the browser cache 434, and will be displayed with a size of 1 pixel by 1 pixel. Such an HTML statement may be a final or near-final object referenced on the web page 432, such that the graphics file referenced therein is rendered in an area that a user may not see or notice.

An exemplary HTML statement capable of initiating retrieval of a graphics file into a browser cache without subsequent graphics file display is as follows:

<img src="segment1.gif" width=0, height=0>

This HTML statement effectively references a GIF file defined to have zero displayed height and width. However, HTML statements that reference graphics files in a conventionally displayable manner may be more robust.

In one embodiment, one or more graphics or image files encapsulating file segments is be displayed on a web page 432 in a normal manner. In such an embodiment, a small or generally small amount of data comprising or corresponding to a segment of a file targeted for downloading is encoded into an image intended for display in a manner analogous or essentially analogous to digital watermarking. Segment data is extracted from such an image (or equivalently, a graphics file containing the image) using a luminosity channel. A graphics file containing image data intended for display as well as segment data may thus be displayed such that the segment data is imperceptible or generally imperceptible to a user.

In accordance with the present invention, a file targeted for downloading 240 may be of significant size, while a given graphics file encapsulating a portion or segment of such a file may be approximately 50 kilobytes or smaller. The present invention supports other encapsulative graphics file sizes, for example 30, 40, and/or 60 kilobytes, in various embodiments.

In view of the foregoing, a file targeted for downloading 240 may be segmented and encapsulated into multiple graphics files. In one embodiment, retrieval of multiple graphics files in accordance with the present invention is facilitated through a CGI script. An HTML statement that references a CGI script that delivers graphics files encapsulating a file targeted for downloading 240 is as follows:

<img src="transfer.cgi?cmd=gif" border="0"
    width=1, height=1>

Within the segment distribution server 300, a CGI script comprising or corresponding to the segment transfer module 340 may selectively deliver one or more graphics files as appropriate to the browser cache 434 within a segment unification system 400 in response to the above HTML statement.

Other types or statements may effectuate the transfer of one or more graphics files encapsulating a file targeted for downloading 240 into a browser cache 434. Such statements may include, for example, Javascript statements such as the following:

img1=new image( );

img1.src="segment1.gif"

img2=new image( );

img2.src="segment2.gif"

The aforementioned Javascript statements may result in the caching of two GIF files without their subsequent display. Those skilled in the art will recognize that additional or alternative techniques that also result in the transfer of graphics files encapsulating portions of a file targeted for downloading 240 in accordance with the present invention.

Referring again to FIG. 4, the memory 420 additionally includes a segment management module 440, and an installation module 450, and possibly a system interrogator 460 and a download management module 470. The segment management module 440 tracks the receipt of graphics files that encapsulate segments of any given file targeted for downloading 240, and maintains the segment assembly database 424. The segment assembly database 424 may include a set of web cookies or generally equivalent information capable of indicating an extent to which segments comprising a file targeted for downloading 240 have been received in the form of graphics files. Depending upon embodiment details, one or more portions of the segment assembly database 424 may additionally or alternatively be maintained by a server-side process such as a CGI script or server-side session tracking module, in a manner understood by those skilled in the art. Those skilled in the art will further understand that the use of cookies, while generally straightforward from an implementation perspective, is not required, since the present invention may employ other session tracking techniques. The segment management module 440 may additionally extract file segments from graphics files received, and selectively assemble and/or conjoin related segments to reconstruct portions of the file targeted for downloading 240.

A file targeted for downloading 240 may comprise executable program code. The installation module 450 may manage software installation operations for such executable program code. The system interrogator 460 may periodically determine whether updated information associated with hardware and/or software resources within the segment unification system 400 may be available. The system interrogator 460 may communicate with the download management module 450 to retrieve such updated information encapsulated into a set of graphics files in accordance with the present invention. The download management module 470 may enable the retrieval of the aforementioned updated information during idle or quiescent web surfing periods.

One or more of the segment management module 440, the installation module 450, the system interrogator 460, and/or the download management module 470 may comprise a browser plug-in. Operations performed and/or facilitated by the segment management module 440, the installation module 450, the system interrogator 460, and/or the download management module 470 are described in detail below with reference to FIGS. 6, 8, and 9.

In accordance with the present invention, a file targeted for downloading 240 is divided or parceled into a set of segments, which in turn are encapsulated into a set of graphics files. When a web browser 432 paints a web page that includes one or more references to such graphics files, the graphics files may be transferred or downloaded into the browser cache 434. A segment distribution server 300 transfers such graphics files to one or more proxy servers 122 and a cache therein or associated therewith in a manner readily understood by those skilled in the art, thereby easing demands upon the segment distribution server 300. Once an entire set of graphics files corresponding to a file targeted for downloading 240 has been received, file segments are extracted therefrom, and assembled to recreate the file. Because the embodiments of the present invention facilitate the download of small or generally small graphics files during the course of web surfing operations, and recreates a file targeted for downloading 240 therefrom, file downloading appears to be nearly instantaneous to a user.

Figure 5:
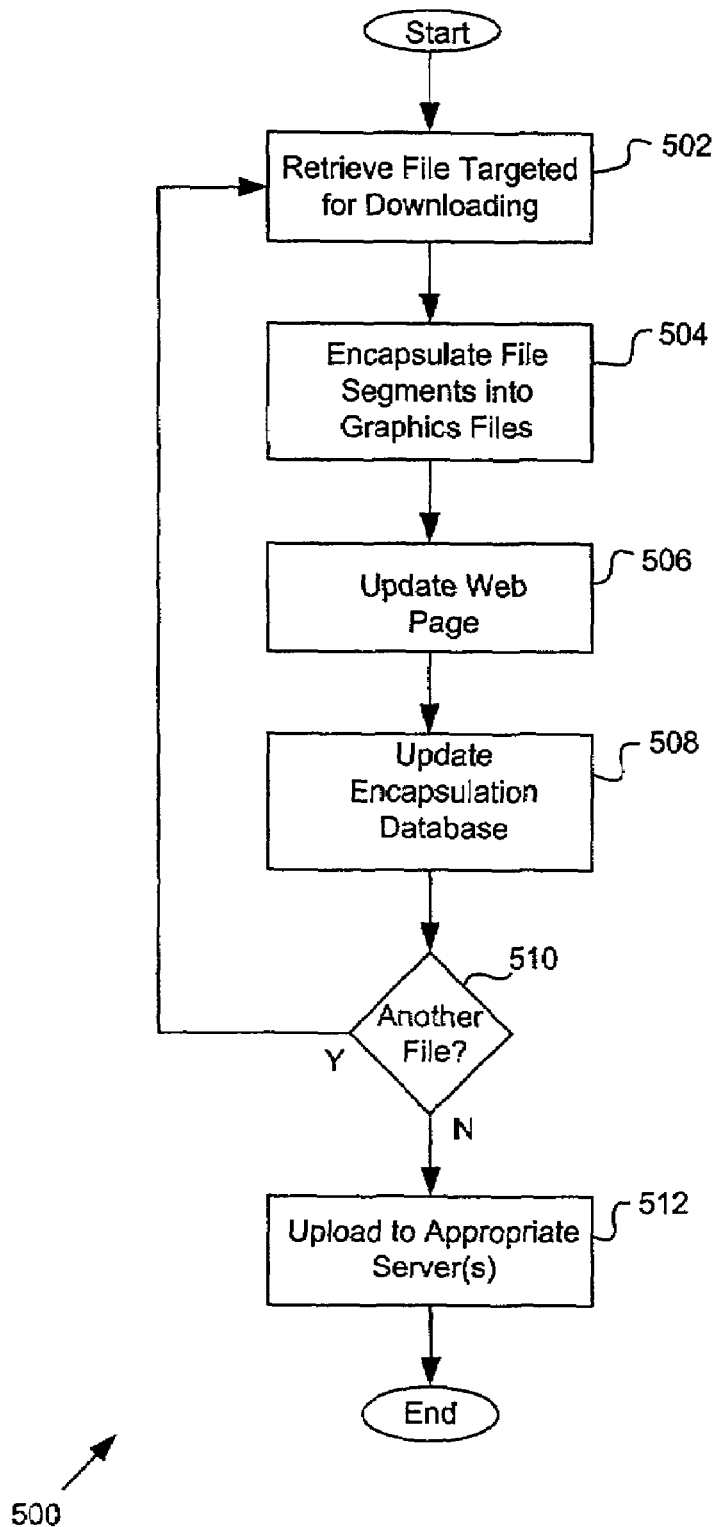
FIG. 5 is a flowchart of a procedure for performing file segmentation operations according to an embodiment of the invention.

FIG. 5 is a flowchart of a procedure 500 for performing file segmentation operations according to an embodiment of the invention. The procedure 500 may be performed upon a file segmentation system 200 such as that shown in FIG. 2. In one embodiment, the procedure 500 begins in step 502 with retrieval of a file targeted for downloading 240 and which requires segmentation and encapsulation into one or more graphics files. Next, the procedure 500 encapsulates portions or segments of the file into a set of graphics files in step 504. During step 504, the procedure 500 can divide portions the file targeted for downloading 240 into segments, and encapsulate such segments into a data section of a graphics file defined in accordance with essentially any standard graphics file format.

Following step 504, the procedure 500 updates a web page definition to reference the encapsulative graphics files or a script corresponding thereto in step 506. Next, in step 508, the procedure 500 updates an encapsulation database 224 (of FIG. 2) to include a reference to the unsegmented file; a reference to the corresponding set of encapsulative graphics files; a reference to a web page 432 such as that described above with reference to FIG. 4 that itself references such graphics files; and a reference to a segment distribution server to which the encapsulative graphics files and the web page shall reside.

After step 508, the procedure 500 determines whether another file targeted for downloading 240 requires segmentation and encapsulation, as in step 510. If so, the procedure 500 returns to step 502; otherwise, the procedure 500 uploads encapsulative graphics files and corresponding web pages 432 to an appropriate set of servers in step 512. Such servers may include one or more segment distribution servers 300, upon which encapsulative graphics files and possibly their corresponding web pages may reside.

Figure 6:
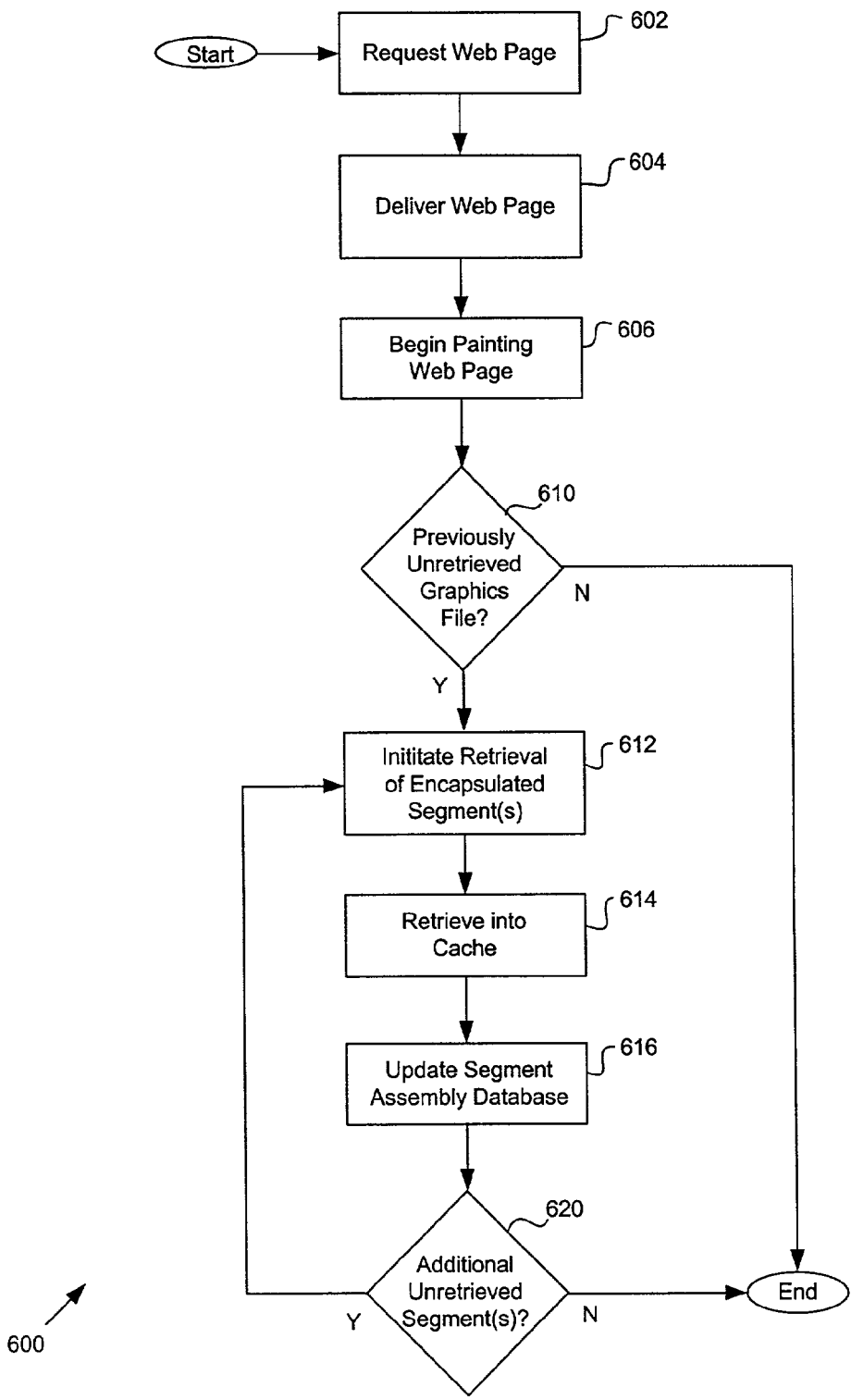
FIG. 6 is a flowchart of a procedure for retrieving encapsulated file segments according to an embodiment of the invention.

FIG. 6 is a flowchart of a procedure 600 for retrieving encapsulated file segments according to an embodiment of the invention. In one embodiment, the procedure 600 begins in step 602 with a web browser 430 such as that described above with reference to FIG. 4 requesting a web page 432. The web browser 430 may reside within a segment unification system 400. The procedure 600 delivers the web page 432 in step 604, after which the web browser 430 begins painting the web page 432 upon a display device 410 in step 606.

In step 610, the procedure 600 subsequently determines whether the web page 432 references a previously unretrieved graphics file that encapsulates a segment corresponding to a file targeted for downloading 240. During step 610, a segment management module 440 such as that shown in FIG. 4 examines the segment assembly database 424 and/or the browser cache 434 to determine which segments of a given file targeted for downloading 240 have been previously retrieved. The procedure 600 subsequently initiates the retrieval of one or more appropriate encapsulative graphics files in step 612. Step 612 may be performed during the execution of one or more HTML or other types of statements. Next, in step 614, one or more encapsulative graphics files are received into the browser cache 434. The procedure 600 then appropriately updates the segment assembly database 424 in step 616. After step 616, the procedure 600 determines whether another encapsulative graphics file is to be downloaded in step 620. If so, the procedure 600 returns to step 612; otherwise, the procedure 600 ends.

Figure 7:
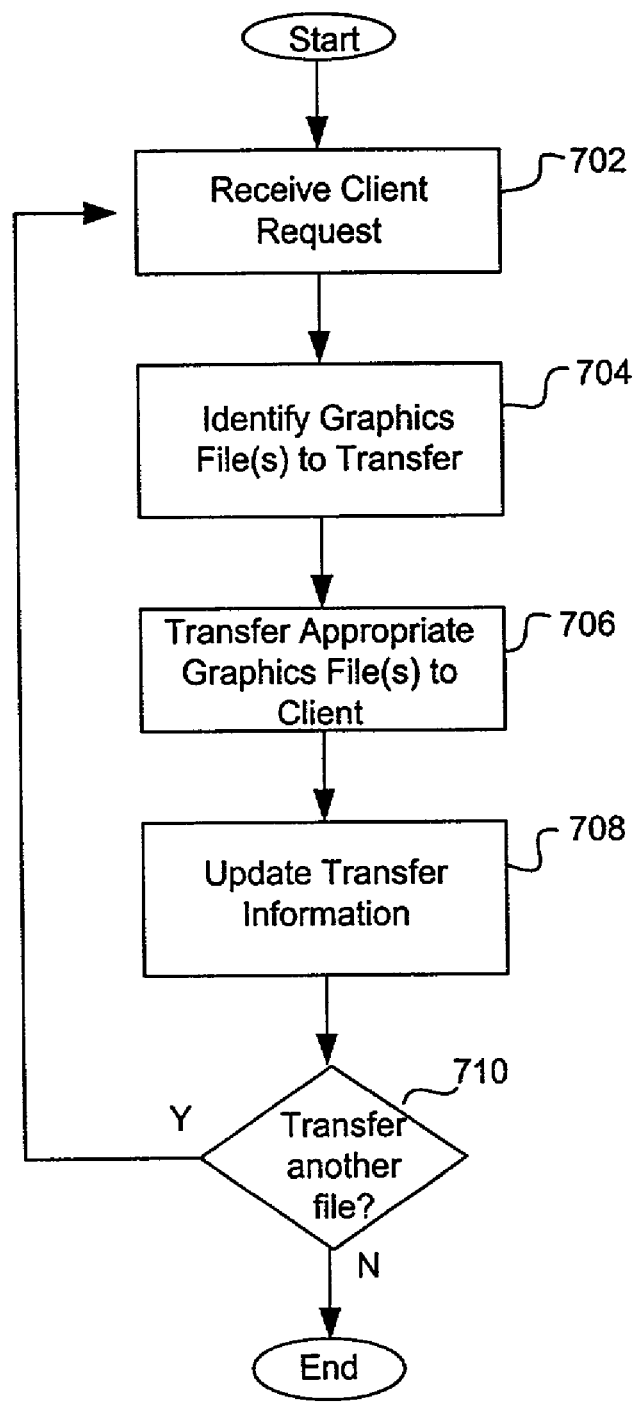
FIG. 7 is a flowchart of a procedure for delivering encapsulated segments according to an embodiment of the invention.

FIG. 7 is a flowchart of a procedure 700 for delivering encapsulated segments according to an embodiment of the invention. The procedure 700 may be performed upon or in conjunction with a segment distribution server 300 such as that shown in FIG. 3. In one embodiment, the procedure 700 begins in step 702 with receipt of a client request corresponding to one or more graphics files encapsulating segments of a file targeted for downloading 240. Next, the procedure 700 identifies one or more such graphics files to be transferred in step 704. The procedure 700 may perform such identification by examining the client request, and/or retrieving or obtaining a cookie or other information from the requesting client. Following step 704, the procedure transfers an appropriate encapsulative graphics file to the requesting client in step 706, and subsequently updates graphics file transfer information in step 708. The graphics file transfer information resides locally, and/or remotely upon the client. The procedure 700 next determines whether another encapsulative graphics file requires transfer in step 710. If so, the procedure returns to step 704; otherwise, the procedure 700 ends.

Figure 8:
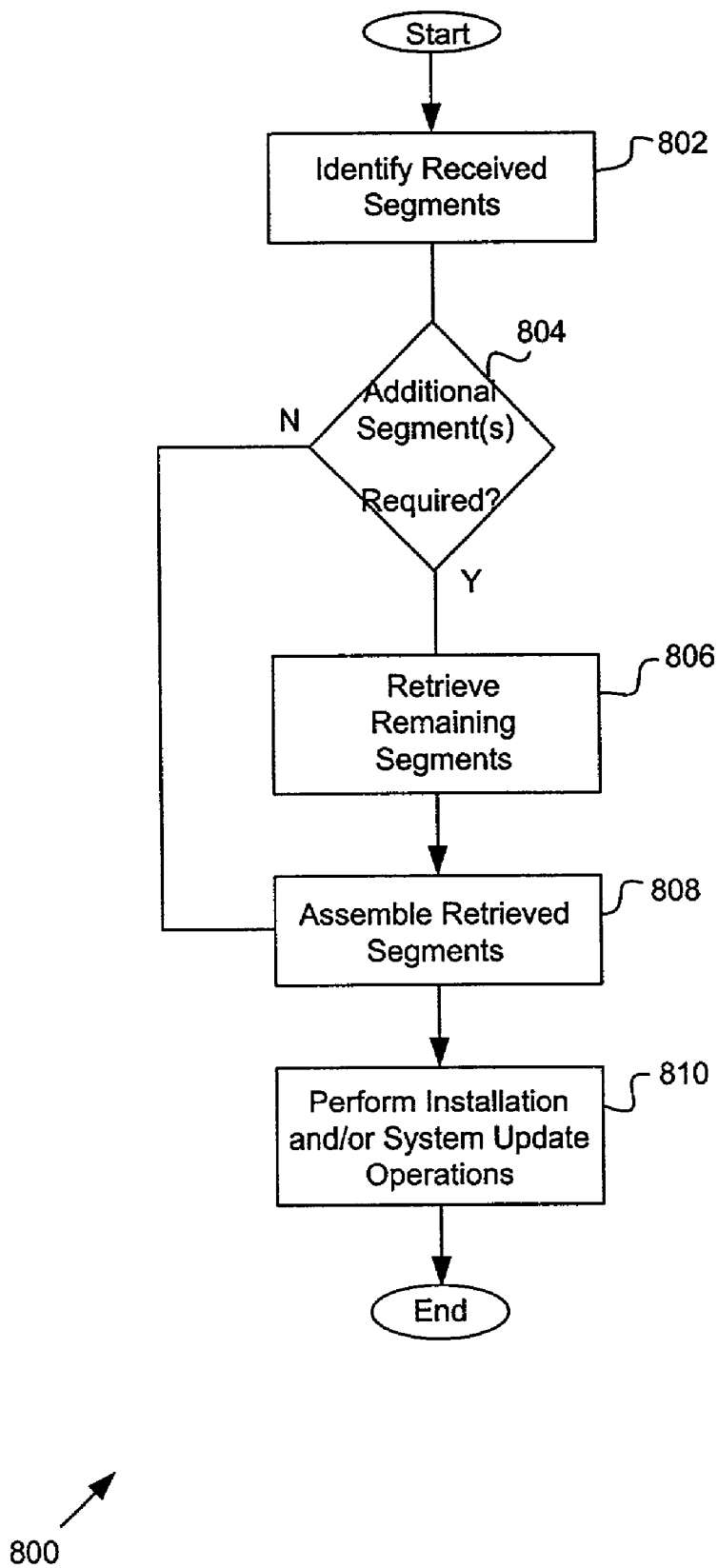
FIG. 8 is a flowchart of a procedure for performing segment unification operations according to an embodiment of the invention.

FIG. 8 is a flowchart of a procedure 800 for performing segment unification operations according to an embodiment of the invention. The procedure 800 may be performed upon a segment unification system 400 such as that shown in FIG. 4. In one embodiment, the procedure 800 begins in step 802 by determining what segments from a file targeted for downloading 240 have already been received. Following step 802, step 804 determines whether additional segments are required, that is, whether the complete set of segments comprising the file targeted for downloading 240 has been received. Steps 802 and/or 804 may be performed by or in conjunction with a segment management module 440, which examines the segment assembly database 424 and/or the browser cache 434 to make such determinations.

If additional segments are required, the procedure 800 initiates retrieval of graphics files encapsulating the required segments in step 806. Following step 806, or after step 804 in the event that additional segments are not required, the procedure 800 assembles retrieved segments to recreate the file targeted for downloading 240 in step 808. During step 808, the procedure 800 extracts or reads segment data from graphics or image files encapsulating such segments. Following step 808, the procedure 800 performs installation and/or system update operations in step 810. Installation operations may be performed in the event that the recreated file, that is, the assembled segments, correspond to an executable file. System update operations may be performed in the event that the assembled segments provide or correspond to updated system resources, such as device drivers.

Figure 9:
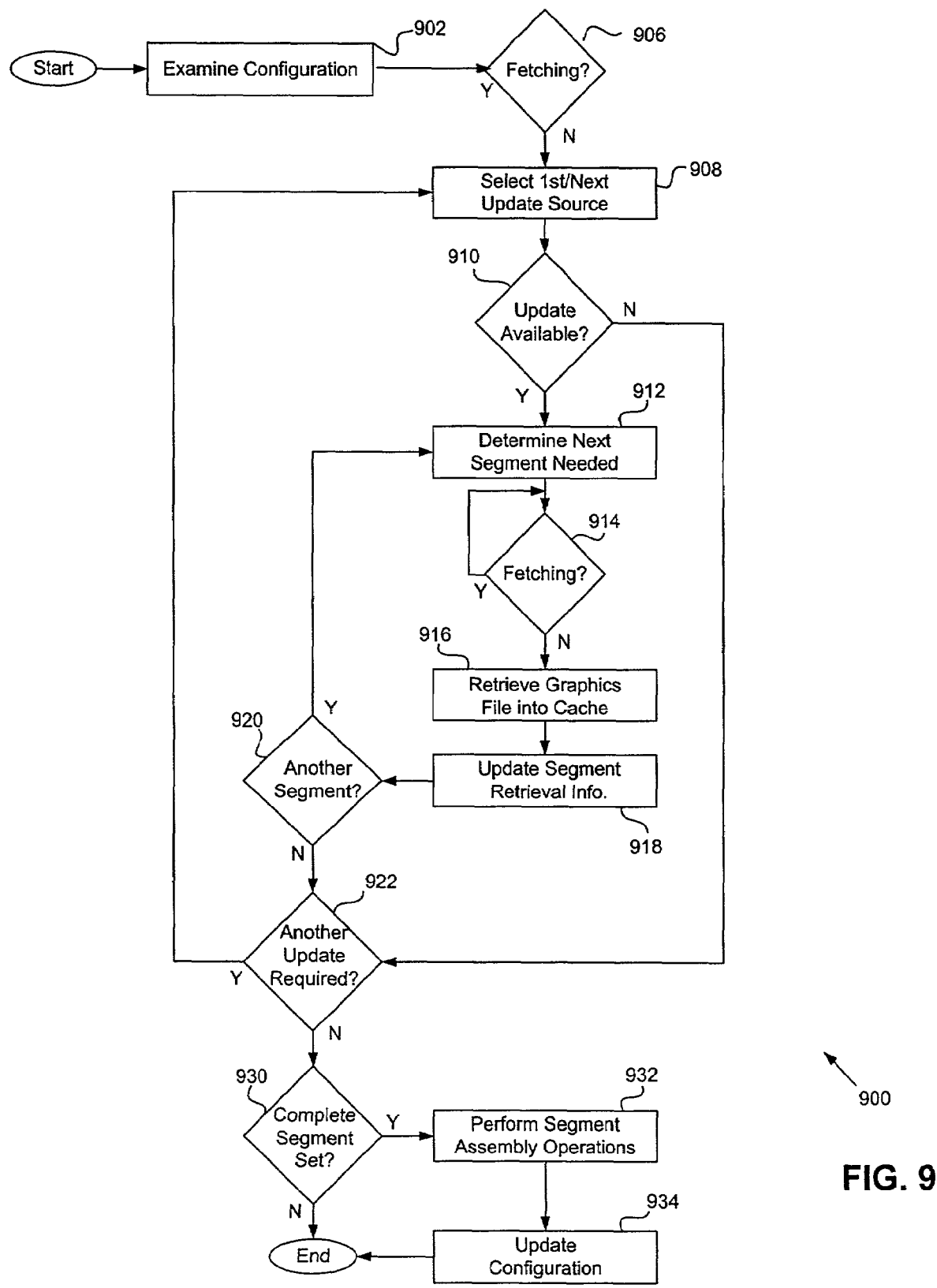
FIG. 9 is a flowchart of a procedure for enhanced efficiency automatic information updating according to an embodiment of the invention.

FIG. 9 is a flowchart of a procedure 900 for performing enhanced efficiency automatic information updating according to an embodiment of the invention. The procedure 900 may be automatically performed on a periodic basis when a web browser 432 is executing or instantiated. In one embodiment, the procedure 900 begins in step 902 by examining local system configuration information, and identifying information that requires updating. Such system configuration information may specify files, device drivers, virus definition files, and/or other updateable information, as well as corresponding retrieval sources and most-recent retrieval dates. In an alternate embodiment, the procedure 900 may be applied to retrieval of information such as advertisements, coupons, and/or promotional materials.

The procedure 900 subsequently determines whether the web browser is fetching information in step 906. If so, the procedure 900 remains at step 906. Otherwise, the procedure 900 selects a first or next update source in step 908, and communicates with such a source in step 910 to determine whether updated information is available.

If updated information is available, the procedure 900 determines a next segment of such information to be retrieved in step 912. The procedure 900 subsequently determines whether the web browser 432 is currently fetching other information in step 914. If so, the procedure 900 remains at step 914; otherwise, the procedure 900 issues a retrieval request in step 916, thereby initiating retrieval of a graphics file that encapsulates the current segment into the browser cache 434.

Next, in step 918, the procedure 900 updates information such as a cookie that is capable of indicating a retrieved segment count. The procedure 900 subsequently determines whether another segment requires retrieval in step 920. If so, the procedure 900 returns to step 912; otherwise, the procedure 900 determines in step 922 whether other update information is required. If so, the procedure 900 returns to step 908.

The procedure 900 subsequently determines in step 930 whether at least one complete set of segments corresponding to updateable information has been retrieved. If not, the procedure 900 ends. Otherwise, the procedure 900 performs segment assembly operations in step 932. The procedure 900 subsequently updates system and/or configuration information accordingly in step 934, after which the procedure 900 ends.

What is claimed is:

1. A method for downloading data, comprising the steps of:
   partitioning a non-image format file targeted for downloading into a set of segments, each segment comprising segment data;
   encapsulating the set of segments into a set of graphics files, wherein the segments are non-textual and graphically camouflaged in a non-evident manner;
   downloading a subset of graphics files within the set of graphics files into a cache corresponding to a computer system coupled to the Internet;
   using a luminosity channel to extract segment data encapsulated within the subset of graphics files to recreate a portion of the file targeted for downloading; and
   selectively assembling and conjoining related segments to reconstruct portions of the non-image format file targeted for downloading.

2. The method of claim 1, wherein the encapsulating step is performed in a manner analogous to digital watermarking to encode segment data into an image.

3. The method of claim 1, wherein the cache comprises one from the group of a browser cache and a proxy server cache.

4. The method of claim 1, further comprising the step of incorporating a reference corresponding to the set of graphics files into a web page definition.

5. The method of claim 1, further comprising the step of incorporating a reference corresponding to the set of graphics files into a web page definition, the reference indicating at least one graphics file is to be displayed in a minimally evident manner during web page painting operations.

6. The method of claim 1, further comprising the step of incorporating a reference corresponding to the set of graphics files into a web page definition, the reference indicating at least one graphics file is to be displayed in a nonevident manner during web page painting operations.

7. The method of claim 1, further comprising the step of incorporating a reference corresponding to the set of graphics files into a web page definition, the reference indicating at least one graphics file is to remain undisplayed during web page painting operations.

8. The method of claim 1, further comprising the step of incorporating into a web page definition a reference corresponding to a script for managing graphics file downloading operations.

9. The method of claim 1, further comprising the steps of:
   incorporating a reference corresponding to the set of graphics files into a web page definition; and
   uploading the web page definition to a server coupled to the Internet.

10. The method of claim 1, further comprising the steps of:
    incorporating a reference corresponding to the set of graphics files into a web page definition; and
    painting a web page corresponding to the web page definition upon a display device corresponding to the computer system.

11. The method of claim 1, further comprising the steps of:
    incorporating a reference corresponding to the set of graphics files into a web page definition; and
    painting a web page corresponding to the web page definition upon a display device corresponding to the computer system, wherein the downloading step is performed in association with painting the web page.

12. The method of claim 1, wherein the downloading step comprises the steps of:
    determining which graphics files within the set of graphics files have been downloaded; and
    issuing a request to retrieve a next graphics file within the set of graphics files.

13. The method of claim 1, wherein the downloading step comprises the steps of:
    determining which graphics files within the set of graphics files currently reside within the cache; and
    issuing a request to retrieve a next graphics file within the set of graphics files.

14. The method of claim 1, wherein the downloading step comprises the steps of:
    determining which graphics files within the set of graphics files have been downloaded;
    issuing a request to retrieve a next graphics file within the set of graphics files; and
    updating information indicating which graphics files within the set of graphics files have been downloaded.

15. The method of claim 1, further comprising the step of uploading the set of graphics files to a server coupled to the Internet.

16. The method of claim 1, wherein at least one graphics file within the set of graphics files corresponds to one from the group of a Graphics Interchange Format file and a Portable Network Graphics file.

17. The method of claim 1, wherein the downloading and extracting steps are performed repeatedly until the file targeted for downloading is fully recreated upon the computer system.

18. A method for downloading data comprising the steps of:
    partitioning a non-image format file targeted for downloading into a set of segments, each segment comprising segment data;
    encapsulating the set of segments into a set of graphics files, wherein the segments are non-textual and graphically camouflaged in a non-evident manner;
    downloading the set of graphics files into a cache corresponding to a computer system coupled to the Internet;
    using a luminosity channel to extract segment data encapsulated within the set of graphics files to recreate the file targeted for downloading upon the computer system; and
    selectively assembling and conjoining related segments to reconstruct portions of the non-image format file targeted for downloading.

19. The method of claim 18, further comprising the step of painting a web page upon a display device corresponding to the computer system, wherein the downloading step is performed in association with painting the web page.

20. The method of claim 18, wherein the file targeted for downloading comprises an executable file.

21. The method of claim 18, wherein the file targeted for downloading comprises one from the group of a device driver and a virus definition file.

22. The method of claim 18, further comprising the step of performing installation operations in the event that the file targeted for downloading comprises an executable file.

23. A method performed upon a browser-enabled computer coupled to the Internet, the method comprising the steps of:
    retrieving a web page definition from a server;
    initiating web page painting operations;

retrieving a graphics file and non-image format files referenced by the web page definition;

receiving the graphics file and the non-image format files into a cache;

using a luminosity channel to extract from the graphics file and the non-image format files a segment of a file targeted for downloading, wherein the segment is non-textual and graphically camouflaged in a non-evident manner and wherein the file targeted for downloading comprises data other than image data intended for display; and selectively assembling and conjoining related segments to reconstruct portions of the non-image format file targeted for downloading.

24. The method of claim 23, wherein the cache comprises a browser cache.

25. The method of claim 23, further comprising the step of displaying the graphics file and the non-image format files upon a display device in one from a group of a nonevident and a minimally evident manner.

26. A method performed upon a browser-enabled computer coupled to the Internet, the method comprising the steps of:

retrieving a web page definition from a server;

initiating web page painting operations;

retrieving a set of non-image format files and graphics files referenced by the web page definition;

receiving the set of non-image format files and graphics files into a cache;

using a luminosity channel to extract from the set of non-image format files and graphics files a set of segments corresponding to a file targeted for downloading, wherein the segments are non-textual and graphically camouflaged in a non-evident manner;

recreating the file targeted for downloading from the set of segments, wherein the file targeted for downloading comprises data other than image data intended for display; and selectively assembling and conjoining related segments to reconstruct portions of the non-image format file targeted for downloading.

27. The method of claim 26, wherein the file targeted for downloading comprises an executable file.

28. The method of claim 26, wherein the file targeted for downloading comprises one from the group of a device driver and a virus definition file.

29. The method of claim 26, further comprising the step of performing installation operations in the event that the file targeted for downloading corresponds to an executable file.

30. A computer readable storage medium storing computer executable instructions capable of causing a computer to perform the steps of:

retrieving a web page definition from a server;

initiating web page painting operations;

retrieving a non-image format file referenced by the web page definition;

receiving the non-image format file into a cache;

using a luminosity channel to extract from the non-image format file a segment of a file targeted for downloading, wherein the file targeted for downloading comprises data other than image data intended for display, wherein the segments is non-textual and graphically camouflaged in a non-evident manner; and selectively assembling and conjoining related segments to reconstruct portions of the non-image format file targeted for downloading.

31. The computer readable storage medium of claim 30, further storing computer executable instructions for causing the computer to perform the step of performing installation operations in the event that the file targeted for downloading comprises an executable file.

32. The computer readable storage medium of claim 30, further storing computer executable instructions for causing the computer to perform the step of performing system update operations in the event that the file targeted for downloading comprises one of the group of a device driver and a virus definition file.

33. The computer readable storage medium of claim 30, wherein the computer executable instructions comprise a browser plug-in.

* * * * *

UNITED STATES PATENT AND TRADEMARK OFFICE
CERTIFICATE OF CORRECTION

PATENT NO. : 7,146,434 B2 Page 1 of 1
APPLICATION NO. : 10/146553
DATED : December 5, 2006
INVENTOR(S) : Kevin G Currans It is certified that error appears in the above-identified patent and that said Letters Patent is hereby corrected as shown below:

In column 12, line 21, in Claim 30, delete "segments" and insert -- segment --, therefor.

Signed and Sealed this

Eleventh Day of August, 2009

David J. Kappos
*Director of the United States Patent and Trademark Office*